US011405242B2

(12) United States Patent
Hossain et al.

(10) Patent No.: US 11,405,242 B2
(45) Date of Patent: Aug. 2, 2022

(54) METHODS AND CIRCUITS FOR DECISION-FEEDBACK EQUALIZATION WITH EARLY HIGH-ORDER-SYMBOL DETECTION

(71) Applicant: Rambus Inc., San Jose, CA (US)

(72) Inventors: Masum Hossain, Edmonton (CA);
Nhat Nguyen, San Jose, CA (US);
Charles Walter Boecker, Ames, IA (US)

(73) Assignee: Rambus Inc., San Jose, CA (US)

( * ) Notice: Subject to any disclaimer, the term of this patent is extended or adjusted under 35 U.S.C. 154(b) by 0 days.

(21) Appl. No.: 17/252,799

(22) PCT Filed: Jun. 14, 2019

(86) PCT No.: PCT/US2019/037368
§ 371 (c)(1),
(2) Date: Dec. 16, 2020

(87) PCT Pub. No.: WO2020/009794
PCT Pub. Date: Jan. 9, 2020

(65) Prior Publication Data
US 2021/0250207 A1    Aug. 12, 2021

Related U.S. Application Data

(60) Provisional application No. 62/693,260, filed on Jul. 2, 2018, provisional application No. 62/749,869, filed on Oct. 24, 2018.

(51) Int. Cl.
*H04L 25/03*    (2006.01)
(52) U.S. Cl.
CPC ............... *H04L 25/03057* (2013.01)

(58) Field of Classification Search
CPC .......... H04L 25/0264; H04L 25/03006; H04L 25/03057; H04L 2025/0349; H04L 2025/03503; H04L 2025/03643
(Continued)

(56) References Cited

U.S. PATENT DOCUMENTS 6,192,072 B1    2/2001    Azadet et al.
7,949,041 B2    5/2011    Zerbe et al.
(Continued)

FOREIGN PATENT DOCUMENTS

WO    2017066251 A1    4/2017

OTHER PUBLICATIONS

Chen et al., "Power Optimized ADC-Based Serial Link Receiver," IEEE Journal of Solid-State Circuits, vol. 47, No. 4, Apr. 2012 (14 pages).
(Continued)

*Primary Examiner* — Young T. Tse
(74) *Attorney, Agent, or Firm* — Silicon Edge Law Group LLP; Arthur J. Behiel

(57) ABSTRACT

A PAM-4 DFE receives an input signal distorted by inter-symbol interference (IS I) and expressing a series of symbols each representing one of four pulse amplitudes to convey two binary bits of data per symbol. High-order circuitry resolves the most-significant bit (MSB) of each two-bit symbol, whereas low-order circuitry 115 resolves the immediate least-significant bit (LSB). An immediate value of the MSB is used to select a set of IS I offsets used to resolve the LSB. Resolved values of the prior values of the MSB and LSB are then used to select the IS I offset for the immediate symbol.

19 Claims, 3 Drawing Sheets

(58) Field of Classification Search
USPC .............. 375/232, 233, 346, 348, 350, 353; 708/322, 323
See application file for complete search history.

(56) References Cited

U.S. PATENT DOCUMENTS

| | | | |
|---|---|---|---|
| 8,699,558 | B1 | 4/2014 | Wang |
| 8,724,688 | B1* | 5/2014 | Gagnon ............ H04L 25/03063 375/233 |
| 9,215,112 | B2 | 12/2015 | Leibowitz et al. |
| 2007/0080718 | A1* | 4/2007 | Stojanovic ............ H04L 25/061 326/87 |
| 2013/0111307 | A1* | 5/2013 | Zhou ................. H04L 25/03057 714/799 |
| 2013/0195231 | A1* | 8/2013 | Hearne ................ H03G 3/3078 375/345 |
| 2013/0322512 | A1 | 12/2013 | Francese et al. |
| 2014/0049244 | A1 | 2/2014 | Dimitriu et al. |
| 2017/0171006 | A1 | 6/2017 | Baecher et al. |
| 2017/0373887 | A1 | 12/2017 | Ho |
| 2020/0106649 | A1* | 4/2020 | Peng .................. H03F 3/45237 |

OTHER PUBLICATIONS

Chung, "ADC-Based Backplane Receivers: Motivations, Issues and Future," Journal of Semiconductor Technology and Science, vol. 16, No. 3, Jun. 2016 (12 pages).

Pola et al., "Low-Complexity Decision Feedforward Equalizer Architecture for High-Speed Receivers on Highly Dispersive Channels," Hindawi Publishing Corporation, Journal of Electrical and Computer Engineering, vol. 2013 (11 pages).

Sarvari et al., "A 5Gb/s Speculative DFE for 2x Blind ADC-based Receivers in 65-nm CMOS," 2010 Symposium on VLSI Circuits/Technical Digest of Technical Papers (2 pages).

Shafik et al., "Embedded Equalization for ADC-Based Serial I/O Receivers," Electrical Performance of Electronic Packaging and Systems (EPEPS), 2011 (4 pages).

Zhang et al., "PAM4 Signaling for 56G Serial Link Applications—A Tutorial," DesignCon 2016 (91 pages).

Notification of Transmittal of the International Search Report and the Written Opinion of the International Searching Authority, or the Declaration dated Aug. 30, 2019 re: Int'l Appln. No. PCT/US19/37368 (11 pages).

EP Extended European Search Report dated Aug. 2, 2021 re: EP Appln. No. 19830944.5. 8 pages.

* cited by examiner

METHODS AND CIRCUITS FOR DECISION-FEEDBACK EQUALIZATION WITH EARLY HIGH-ORDER-SYMBOL DETECTION

BACKGROUND

Binary communication systems represent information using just two symbols—e.g. relatively high and low voltages—to alternatively represent a logical one and a logical zero (i.e. 1b or 0b, where "b" is for binary). The number of levels used to represent digital data is not limited to two, however. For example, a type of signaling referred to as PAM-4 (for 4-level pulse-amplitude modulation) uses four separate pulse amplitudes (voltages) to convey two binary bits of data per symbol (i.e., 00b, 01b, 10b, or 11b). A series of symbols can thus be communicated as a voltage signal that transitions between levels in a manner that reflects the series. The time each voltage level is held to represent a symbol is termed the "symbol time" and the speed with which symbols can be communicated is termed the "symbol rate." A receiver recovers a set of symbols from a signal by comparing the voltage during each symbol time against one or more reference-voltage levels to distinguish between symbols.

High performance communication channels suffer from many effects that degrade symbols and consequently render them difficult to resolve. Primary among them are frequency dependent channel loss (dispersion) and reflections from impedance discontinuities. These effects cause neighboring symbols to interfere with one another and are commonly referred to collectively as Inter-Symbol Interference (ISI). For example, neighboring relatively high-voltage symbols may spread out to raise the level of neighboring lower-voltage symbols; the lower-voltage symbols may be interpreted incorrectly. Lower-voltage symbols may likewise induce errors in neighboring higher-voltage symbols.

ISI becomes more pronounced at higher signaling rates, ultimately degrading signal quality such that distinctions between originally transmitted symbols may be lost. Some receivers mitigate the effects of ISI using one or more equalizers. One common type of equalizer, the decision-feedback equalizer (DFE), corrects for ISI imposed on an immediate symbol by a prior symbol by multiplying the value of the prior symbol by a "tap value" calibrated to account for the ISI and adding the resultant positive or negative product to the signal level or the reference level against which the signal is interpreted. ISI from a prior symbol that tends to raise or lower the level of the immediate symbol is thus offset by a similar change in the immediate symbol or the reference against which the immediate symbol is evaluated.

In high-speed systems it can be difficult to resolve recently received symbols in time to calculate their impact on incoming symbols and apply the requisite feedback. Symbol pre-decision is used in some DFEs to ease this timing constraint. Each immediate symbol is sampled with multiple offsets, one for each possible value of the to-be-determined prior symbol or symbols, to obtain multiple tentative samples. The correct tentative sample is then selected when the prior symbol is resolved.

The use of pre-decisions to delay the need for a final decision on a prior symbol reduces the latency of the decision-feedback loop and helps timing closure of the timing critical path. Unfortunately, this advantage requires increasing the requisite number of samples for each symbol, and thus the required circuit area and power. Binary signaling requires two tentative decisions for each prior symbol under consideration. PAM-4 signaling requires twelve tentative decisions, which results in significantly higher power usage and circuit area relative to binary signaling and makes timing closure more difficult.

BRIEF DESCRIPTION OF THE DRAWINGS

The detailed description is illustrated by way of example, and not by way of limitation, in the figures of the accompanying drawings and in which like reference numerals refer to similar elements and in which.

DETAILED DESCRIPTION

Figure 1:
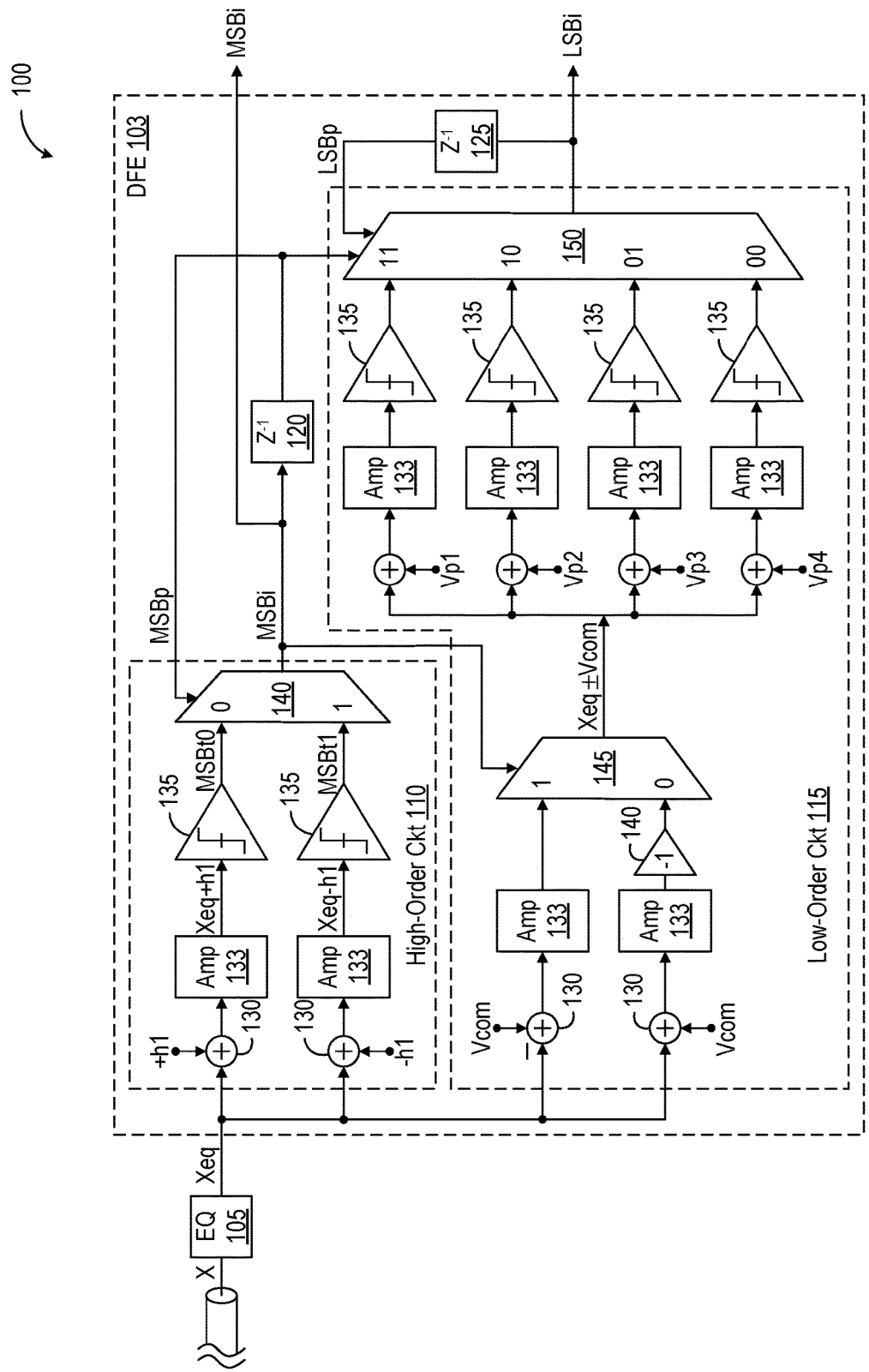
FIG. 1 depicts a receiver 100 that digitizes an input signal X distorted by inter-symbol interference (ISI) and expressing a series of symbols each representing one of four pulse amplitudes to convey two binary bits of data per symbol.

FIG. 1 depicts a receiver 100 that digitizes an input signal X distorted by inter-symbol interference (ISI) and expressing a series of symbols each representing one of four pulse amplitudes (voltages) to convey two binary bits of data per symbol. Receiver 100 includes a passive equalizer 105 and a DFE 103, the latter of which can be divided into N+1 DFE slices as detailed below in connection with FIG. 3. The following discussion is limited to one slice for brevity.

Passive equalizer 105 conveys an equalized input signal Xeq to high-order circuitry 110 and low-order circuitry 115. In this PAM-4 embodiment, high-order circuitry 110 resolves the most-significant bit (MSB) of each two-bit symbol, whereas low-order circuitry 115 resolves the least-significant bit (LSB). The MSB and LSB of the immediate symbol under evaluation are identified as MSBi and LSBi. A pair of unit delay elements 120 and 125 provides the MSB and LSB of prior symbols MSBp and LSBp.

High-order circuitry 110 supports two similar signal paths, one for each of the two possible values of prior symbol's most-significant bit MSBp. Each signal path through circuitry 110 includes an analog adder 130, an amplifier 133, and a sampler 135 feeding one input of a multiplexer 140. High-order circuitry 110 is effectively a DFE that samples incoming symbols using two equal and opposite offsets +h1 and −h1 to produce two tentative samples on alternative inputs of multiplexer 140. Value +h1 (−h1) is calibrated to offset the ISI imposed by an MSB of zero (one) for the prior symbol. In this embodiment each analog adder 130 is e.g. a current digital-to-analog converter (DAC) that injects an offset current into the signal path to compensate for pre-cursor ISI before feeding the resultant offset signal to the corresponding amplifier 133. The corresponding sampler 135 samples the version of equalized signal Xeq with the applied offset to obtain a tentative value of the immediate MSB. In the uppermost signal path, for example, adder 130 and amplifier 133 raise equalized input signal Xeq by +h1 to compensate for a reduction in input signal Xeq caused by ISI from a prior symbol with a low MSB value. The lowermost signal path lowers equalized signal Xeq by the same amount to compensate for an increase caused by a prior symbol with a high MSB value.

Multiplexer 140 then selects between these tentative samples MSBt0 and MSBt1 responsive to the prior symbol resolved as MSBp.

Low-order circuitry 115 extracts the low-order bit of each incoming symbol of equalized signal Xeq. Low-order circuitry 115 offsets incoming symbols Xeq by eight levels. A first multiplexer 145 employs the immediate most-significant bit MSBi from high-order circuitry 110 to select the amplified output from one of two adders 130 that offset the equalized input signal by plus and minus Vcom, where Vcom is a common-mode voltage offset attributed to the immediate level of the most-significant bit. The offset immediate symbol Xeq±Vcom selected by multiplexer 145 is further offset by four levels Vp[4:1], one for each of the four possible values expressed by the prior symbol. These four offset signals are sampled relative to e.g. zero by corresponding samplers 135. A second multiplexer 150 employs the prior most-significant bit MSBp and the prior least-significant bit LSBp to select the immediate least-significant bit LSBi from the selected sampler. Delay element 125 delays the output from multiplexer 150 by one symbol time to output prior least-significant bit LSBp. As in high-order circuitry 110, each analog adder 130 can be e.g. a current DAC that injects an offset current into the signal path to raise or lower the signal voltage to compensate for pre-cursor ISI. The lowermost amplifier 133 to multiplexer 145 inverts the sense of the incoming Vcom-offset signal, a function illustrated schematically as an inverting element 140. Inverting one of the input signals to multiplexer 145 aligns the shapes of symbol eyes associated with the LSB to increase the overall eye opening. The benefit of this approach is discussed further below in connection with an eye diagram 215 of FIG. 2.

Figure 2:
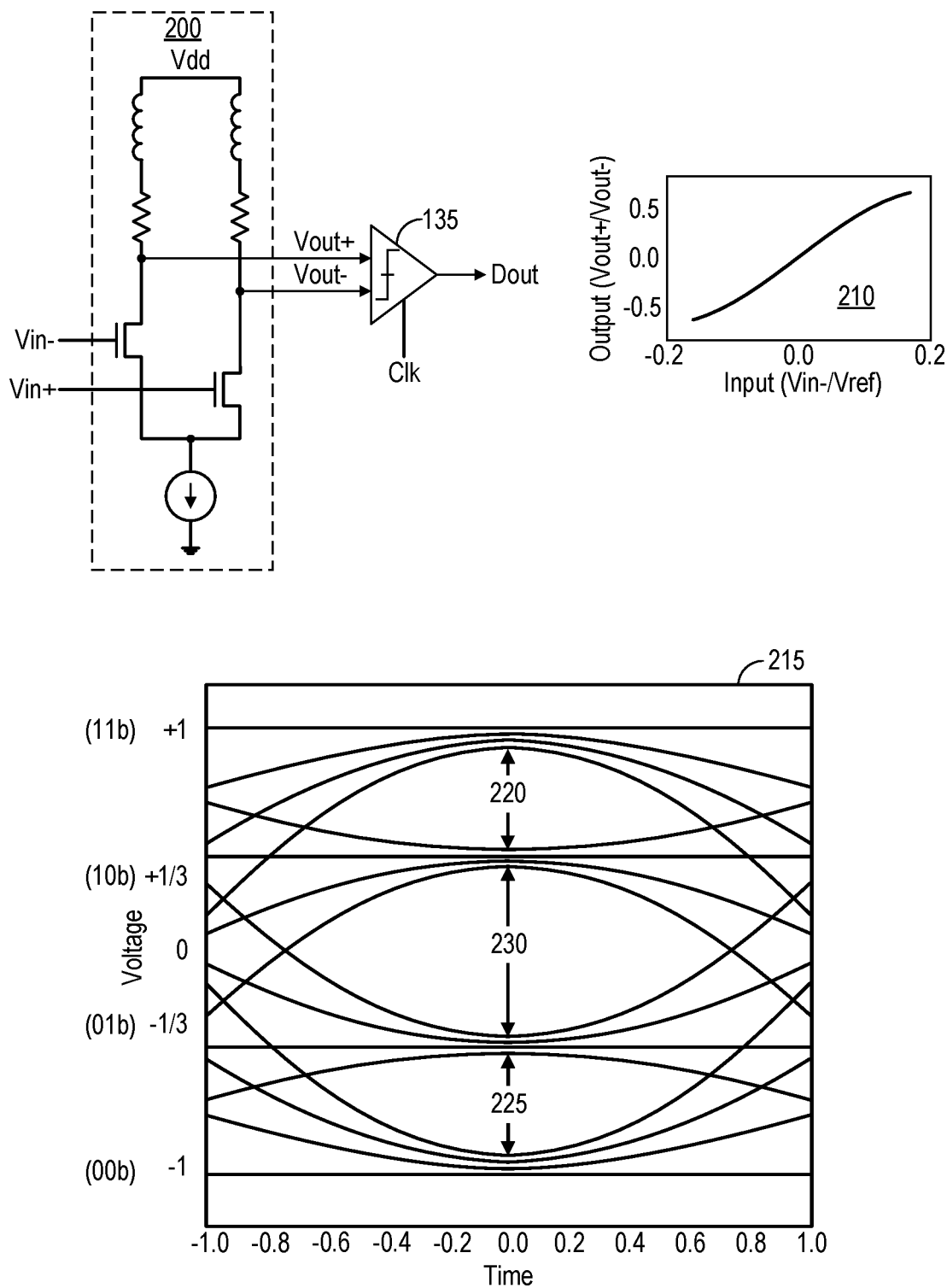
FIG. 2 (prior art) schematically depicts a differential amplifier 200, a voltage diagram 210, and an eye diagram 215.

FIG. 2 (prior art) schematically depicts a differential amplifier 200 that can be employed as amplifiers 133 of FIG. 1. Amplifier 200 amplifies the difference between differential input nodes Vin− and Vin+ to present the output differentially across output nodes Vout+ and Vout−. A sampler 135 produces an output decision Dout representative of a binary one or zero based on the relative levels of output signals Vout+ and Vout− on edges of a clock signal Clk. Offsets of the type illustrated in FIG. 1 can be applied to either or both input nodes. Applying a positive offset to input node Vin− is like applying a negative offset of the same magnitude, for example.

A diagram 210 is included to illustrate a problem of nonlinearity as applied to amplifier 200, and thus DFE 103 more generally. A circuit is called "linear" if the output is a linear function of its inputs. For a voltage amplifier of the type employed by amplifier 200, linearity means that the gain does not change with input voltage. Unfortunately, linear gain is difficult to obtain, particularly for high-speed circuits. Thus, different input voltages are subject to different levels of amplification and output signals are consequently distorted. In the example of diagram 210 gain is relatively linear in the middle of the input voltage range, becoming less linear toward the high and low regions. In a 900 mV system, for example, the linear output range might be limited to about 450 mV peak-to-peak.

An illustrative eye diagram 215 for an illustrative PAM-4 signal relates the voltage of incoming symbols normalized between +1 and −1 with eyes 220, 225, and 230 separating signal levels that correspond to the binary values 11b, 10b, 01b, and 00b. The voltage range is bounded by a 900 mV supply in one embodiment. The relatively high and low eyes 220 and 225 are smaller (more closed) than the central eye 230. DFE 103 of FIG. 1 compensates for this nonlinearity by moving the input signal toward the linear ranges of the various amplifiers 133 in the signal paths.

Each of eyes 220 and 225 tends to be a horizontally asymmetrical mirror image of the other. With reference to FIG. 1, inverting one of the Vcom-shifted signals to multiplexer 145 aligns the shapes of eyes 220 and 225 to increase the overall eye opening for the LSB, and thus improves signaling performance. Signal inversion can be accomplished by e.g. reversing the sense of input nodes Vin− and Vin+ to amplifier 200.

The following Table 1 illustrates the offsets applied to the signal paths of low-order circuitry 115 of DFE 103 of FIG. 1 in evaluating the LSB. Each sampler 135 is assumed to sample its respective differential input relative to zero.

TABLE 1

| Reference | Immediate Symbol (MSBi/LSBi) | Prior Symbol (MSBp/LSBp) | | Offset (w/1 tap) | |
|---|---|---|---|---|---|
| 0 Volts | +1, +1/3 (11b, 10b) | +1 (11b) | −Vcom | Vp1 = −hMSB − hLSB | |
| | | +1/3 (10b) | −Vcom | Vp2 = −hMSB + hLSB | |
| | | −1/3 (01b) | −Vcom | Vp3 = hMSB − hLSB | |
| | | −1 (00b) | −Vcom | Vp4 = hMSB + hLSB | |
| | −1, −1/3 (00b, 01b) | +1 (11b) | Vcom | Vp1 = −hMSB − hLSB | |
| | | +1/3 (10b) | Vcom | Vp2 = −hMSB + hLSB | |
| | | −1/3 (01b) | Vcom | Vp3 = hMSB − hLSB | |
| | | −1 (00b) | Vcom | Vp4 = hMSB + hLSB | |

With reference to FIG. 1, multiplexer 145 passes input signal Xeq offset by plus or minus Vcom based on the immediate value of MSBi, as detected by high-order circuitry 110. Multiplexer 150 then selects one of four samplers 135 based on the values MSBp and LSBp representative of the prior symbol. With reference to the first line of Table 1, for example, if immediate MSBi is 1b—regardless of the value of LSBi—and prior MSBp/LSBp is 11b, then multiplexer 145 conveys the input signal reduced by Vcom and multiplexer 150 selects the output from the sampler 135 that samples the input signal further offset by level Vp1, which further reduces the input signal by the prior MSB's impact (hMSB) and the prior LSB's impact (hLSB). The applied offsets place their respective signals within or nearer to the linear regions of amplifiers 133 and thus improve the linearity of DFE 103.

Figure 3:
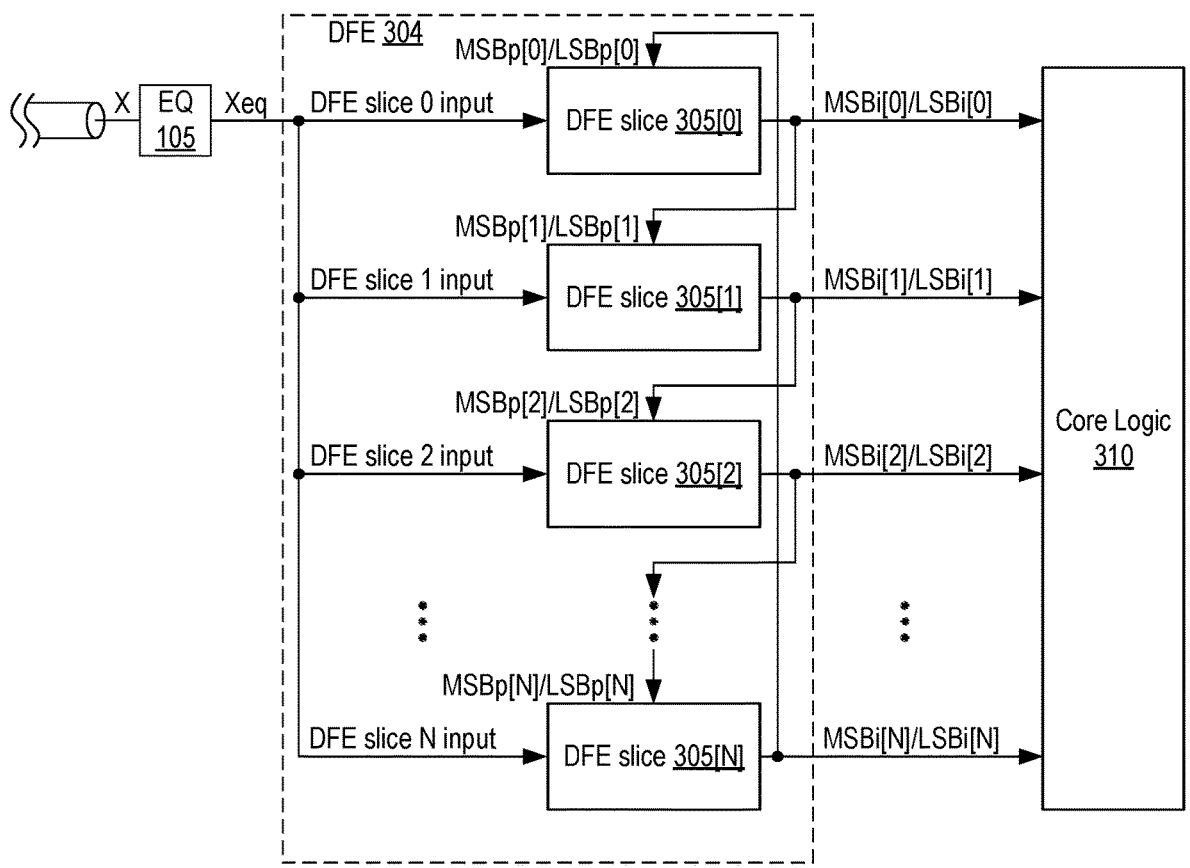
FIG. 3 depicts an integrated circuit 300 that incorporates a passive equalizer 105, a DFE 304, and some core logic 310 that makes use of the data digitized by DFE 103.

FIG. 3 depicts an integrated circuit 300 that incorporates passive equalizer 105 of FIG. 1, a DFE 304, and some core logic 310 that makes use of the data digitized by DFE 304. DFE 304 is divided into N+1 DFE slices 305[N:0]. Each DFE slice can function in the manner of DFE 103 of FIG. 1 and operates at a symbol rate of 1/(N+1) times that of input signal X with a timing offset of one symbol time of input signal X relative to the neighboring slice. DFE slices 305 [N:0] thus process input signal X in parallel to relax timing constraints on DFE 304. The number of DFE slices is e.g. thirty-two (N=31) in this example.

ISI impacts temporally adjacent symbols in input signal X so each DFE slice shares its output with the slice charged with resolving the immediately preceding symbol. Thus the immediate-symbol values MSBi[0]/LSBi[0] for DFE slice 305[0] are the prior-symbol values MSBp[1]/LSBp[1] for DFE slice 305[1]. Unit delay elements 120 and 125 of FIG. 1 may thus be omitted in multi-slice embodiments. Core logic 300 can be any circuitry that makes use of the digitized version of input signal X represented by signals MSBi[N:0]/LSBi[N:0].

In the foregoing description and in the accompanying drawings, specific terminology and drawing symbols are set forth to provide a thorough understanding of the present invention. In some instances, the terminology and symbols may imply specific details that are not required to practice the invention. For example, the interconnection between circuit elements or circuit blocks may be shown or described as multi-conductor or single conductor signal lines. Each of the multi-conductor signal lines may alternatively be single-conductor signal lines, and each of the single-conductor signal lines may alternatively be multi-conductor signal lines. Signals and signaling paths shown or described as being single-ended may also be differential, and vice-versa. Similarly, signals described or depicted as having active-high or active-low logic levels may have opposite logic levels in alternative embodiments.

An output of a process for designing an integrated circuit, or a portion of an integrated circuit, comprising one or more of the circuits described herein may be a computer-readable medium. The computer-readable medium may be encoded with data structures or other information describing circuitry that may be physically instantiated as an integrated circuit or portion of an integrated circuit. Various formats may be used for such encoding. Those of skill in the art of integrated circuit design can develop such data structures from schematic diagrams of the type detailed above and the corresponding descriptions and encode the data structures on computer readable medium. Those of skill in the art of integrated circuit fabrication can use such encoded data to fabricate integrated circuits comprising one or more of the circuits described herein.

While the subject matter has been described in connection with specific embodiments, other embodiments are also envisioned. For example, offsets for some or all the speculative feedback can be applied to references against which the data-carrying signals are measured, or to both data-carrying signals and their corresponding references. DFEs of the type detailed herein can be adapted for multi-PAM signal recovery beyond four levels, for example. Therefore, the spirit and scope of the appended claims should not be limited to the foregoing description. Only those claims specifically reciting "means for" or "step for" should be construed in the manner required under the sixth paragraph of 35 U.S.C. § 112.

What is claimed is:

1. A receiver comprising:
   an input node configured to receive an input signal expressing a series of symbols, each of the symbols representing a symbol value having a high-order bit and a low-order bit, the series of symbols including an immediate symbol representing an immediate-symbol value and a prior symbol representing a prior-symbol value; and
   low-order circuity coupled to the input node to receive the series of symbols, the low-order circuitry configured to select the low-order bit of the immediate-symbol value based on the high-order bit of the immediate-symbol value and the prior-symbol value.

2. The receiver of claim 1, wherein the low-order circuitry selects the low-order bit of the immediate-symbol value based on the high-order bit of the prior-symbol value.

3. The receiver of claim 2, wherein the low-order circuitry selects the low-order bit of the immediate-symbol value based on the low-order bit of the prior-symbol value.

4. A decision-feedback equalizer (DFE) comprising:
   an input node configured to receive an input signal expressing a series of symbols, each of the symbols representing a symbol value having a high-order bit and a low-order bit, the series of symbols including an immediate symbol representing an immediate-symbol value and a prior symbol representing a prior-symbol value;
   high-order circuitry coupled to the input node to receive the series of symbols, the high-order circuitry comprising:
      high-order samplers configured to sample the immediate symbol with high-order offsets to acquire speculative high-order samples of the immediate symbol; and
      a high-order multiplexer coupled to the high-order samplers to select the high-order bit of the immediate-symbol value from among the speculative high-order samples of the immediate symbol based on the high-order bit of the prior-symbol value; and
   low-order circuity coupled to the input node to receive the series of symbols, the low-order circuitry configured to select the low-order bit of the immediate-symbol value based on the high-order bit of the immediate-symbol value and the prior-symbol value.

5. The DFE of claim 4, the low-order circuitry configured to select the low-order bit of the immediate-symbol value based on the high-order bit of the immediate-symbol value, the high-order bit of the prior-symbol value, and the low-order bit of the prior-symbol value.

6. The DFE of claim 4, the low-order circuit comprising:
   a first low-order multiplexer configured to select between alternatively offset immediate-symbol levels responsive to the high-order bit of the immediate symbol.

7. The DFE of claim 6, the low-order circuit further comprising:
   low-order samplers configured to sample the selected alternatively offset immediate-symbol level with low-order offsets to acquire speculative low-order samples of the immediate symbol.

8. The DFE of claim 7, the low-order circuit further comprising:
   a second low-order multiplexer configured to select between the speculative low-order samples responsive to the prior-symbol value.

9. The DFE of claim 4, wherein the high-order bit is a most-significant bit.

10. The DFE of claim 4, wherein the low-order bit is a least-significant bit.

11. The DFE of claim 4, wherein the low-order circuitry and the high-order circuitry are of a first DFE slice, the DFE further comprising an additional DFE slice coupled to the input node to receive the series of symbols.

12. The DFE of claim 11, wherein the prior-symbol value is from the additional DFE slice.

13. A method for resolving an input signal expressing a series of symbols, each of the symbols expressed over a symbol time and representing a symbol value having a high-order bit and a low-order bit, the series of symbols including an immediate symbol representing an immediate-symbol value and a prior symbol representing a prior-symbol value, the method comprising:

resolving the high-order bit of the immediate symbol;

applying offsets to the immediate symbol to produce offset immediate symbols;

selecting one of the offset immediate symbols, a selected offset immediate symbol, responsive to the high-order bit of the immediate symbol;

applying second offsets to the selected offset immediate symbol to produce second offset immediate symbols; and selecting one of the second offset immediate symbols responsive to at least one of the high-order bit of the prior-symbol value and the low-order bit of the prior-symbol value to resolve the low-order bit of the immediate symbol.

14. The method of claim 13, wherein applying the offsets to the immediate symbol applies the offsets to at least one of the input signal and a reference against which the input signal is compared.

15. The method of claim 13, wherein resolving the high-order bit of the immediate symbol comprises:

applying second offsets to the immediate symbol to produce second offset immediate symbols;

sampling the second offset immediate symbols; and selecting one of the second offset immediate symbols as the high-order bit of the immediate symbol responsive to the high-order bit of the prior-symbol value.

16. The method of claim 13, wherein the high-order bit is a most-significant bit.

17. The method of claim 13, wherein the immediate symbol is adjacent the prior symbol in the series of symbols.

18. The method of claim 13, wherein applying the offsets comprising injecting a current into a signal path of the series of symbols.

19. The method of claim 13, wherein the input signal expresses the series of symbols at a symbol rate, the method further comprising sampling the selected one of the offset immediate symbols at a slice rate less than the symbol rate.

\* \* \* \* \*